United States Patent
Kitamura

(10) Patent No.: US 9,762,759 B2
(45) Date of Patent: Sep. 12, 2017

(54) REMOTELY DISPLAYING AN OPERATION SCREEN OF AN IMAGE FORMING APPARATUS

(71) Applicant: KYOCERA Document Solutions Inc., Osaka (JP)

(72) Inventor: Mitsuhiro Kitamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/909,130

(22) PCT Filed: Jul. 3, 2014

(86) PCT No.: PCT/JP2014/067726
§ 371 (c)(1),
(2) Date: Jan. 31, 2016

(87) PCT Pub. No.: WO2015/015994
PCT Pub. Date: Feb. 5, 2015

(65) Prior Publication Data
US 2017/0064101 A1    Mar. 2, 2017

(30) Foreign Application Priority Data

Jul. 31, 2013  (JP) .................. 2013-159377
Jul. 31, 2013  (JP) .................. 2013-159378
Jul. 31, 2013  (JP) .................. 2013-159380

(51) Int. Cl.
*H04N 1/00*       (2006.01)
*G06F 3/12*       (2006.01)
(Continued)

(52) U.S. Cl.
CPC ....... *H04N 1/00344* (2013.01); *G06F 3/1207* (2013.01); *G06F 3/1253* (2013.01);
(Continued)

(58) Field of Classification Search
CPC ........... H04L 65/1006; H04N 1/00344; H04N 1/00204; H04N 1/00244; H04N 1/00506;
(Continued)

(56) References Cited

U.S. PATENT DOCUMENTS 5,438,433 A * 8/1995 Reifman ............ H04N 1/00474
                                                                 358/400
6,476,927 B1 * 11/2002 Schwarz, Jr. ......... G06F 3/1205
                                                                 358/1.13
(Continued)

FOREIGN PATENT DOCUMENTS

JP    2006-332890 A    12/2006
JP    2007-001237 A    1/2007
(Continued)

*Primary Examiner* — Eric A Rust
(74) *Attorney, Agent, or Firm* — Hawaii Patent Services; Nathaniel K. Fedde; Kenton N. Fedde

(57) ABSTRACT

Provided is an image forming apparatus that allows a remote operation terminal to operate an image processing apparatus connected by SIP. On this account, the image forming apparatus (100) connected to the remote operation terminal (300) by SIP includes a remote operation-request message receiving part that receive a remote-operation request message from the remote operation terminal (300), a remote-operation response message transmitting part that transmits a remote-operation response message in response to the remote-operation request message, and an operation-screen information transmitting part that transmits operation screen information of the image forming apparatus (100) to the remote operation terminal (300) in accordance with the communication condition of the communication session when an SIP-based communication session is established between the remote operation terminal (300) and the image forming apparatus (100).

11 Claims, 5 Drawing Sheets

(51) Int. Cl.
*H04L 29/06* (2006.01)
*H04N 1/333* (2006.01)

(52) U.S. Cl.
CPC .......... *G06F 3/1259* (2013.01); *G06F 3/1285* (2013.01); *H04L 65/105* (2013.01); *H04L 65/1006* (2013.01); *H04L 65/1069* (2013.01); *H04N 1/00217* (2013.01); *H04N 1/00244* (2013.01); *H04N 1/00315* (2013.01); *H04N 1/00408* (2013.01); *H04N 1/00464* (2013.01); *H04N 1/00477* (2013.01); *H04N 1/00973* (2013.01); *H04N 1/33323* (2013.01); *H04N 1/33346* (2013.01); *H04N 1/33361* (2013.01); *H04N 1/33392* (2013.01); *H04N 2201/0013* (2013.01); *H04N 2201/0017* (2013.01); *H04N 2201/0039* (2013.01); *H04N 2201/0049* (2013.01); *H04N 2201/0055* (2013.01); *H04N 2201/0074* (2013.01); *H04N 2201/0075* (2013.01); *H04N 2201/0094* (2013.01); *H04N 2201/33342* (2013.01)

(58) Field of Classification Search
CPC ........ H04N 1/00973; H04N 2201/0039; G06F 3/1287; G06F 3/1288

USPC .............................................. 358/1.13, 1.15
See application file for complete search history.

(56) References Cited

U.S. PATENT DOCUMENTS

| | | |
|---|---|---|
| 2006/0293765 A1 | 12/2006 | Tanaka et al. |
| 2007/0171821 A1* | 7/2007 | Matoba ............. H04L 29/06027 370/229 |
| 2008/0297846 A1 | 12/2008 | Noguchi et al. |
| 2009/0231353 A1* | 9/2009 | Han ..................... G03G 15/502 345/581 |
| 2009/0231625 A1 | 9/2009 | Suzuki et al. |
| 2011/0292426 A1 | 12/2011 | Sasano et al. |
| 2012/0019858 A1 | 1/2012 | Sato |
| 2012/0036269 A1 | 2/2012 | Kasuga et al. |
| 2012/2075647 A1 | 11/2012 | Gabe |

FOREIGN PATENT DOCUMENTS

| | | |
|---|---|---|
| JP | 2009-225140 A | 10/2009 |
| JP | 2010-061562 A | 3/2010 |
| JP | 2010-267084 A | 11/2010 |
| JP | 2012-090025 A | 5/2012 |

* cited by examiner

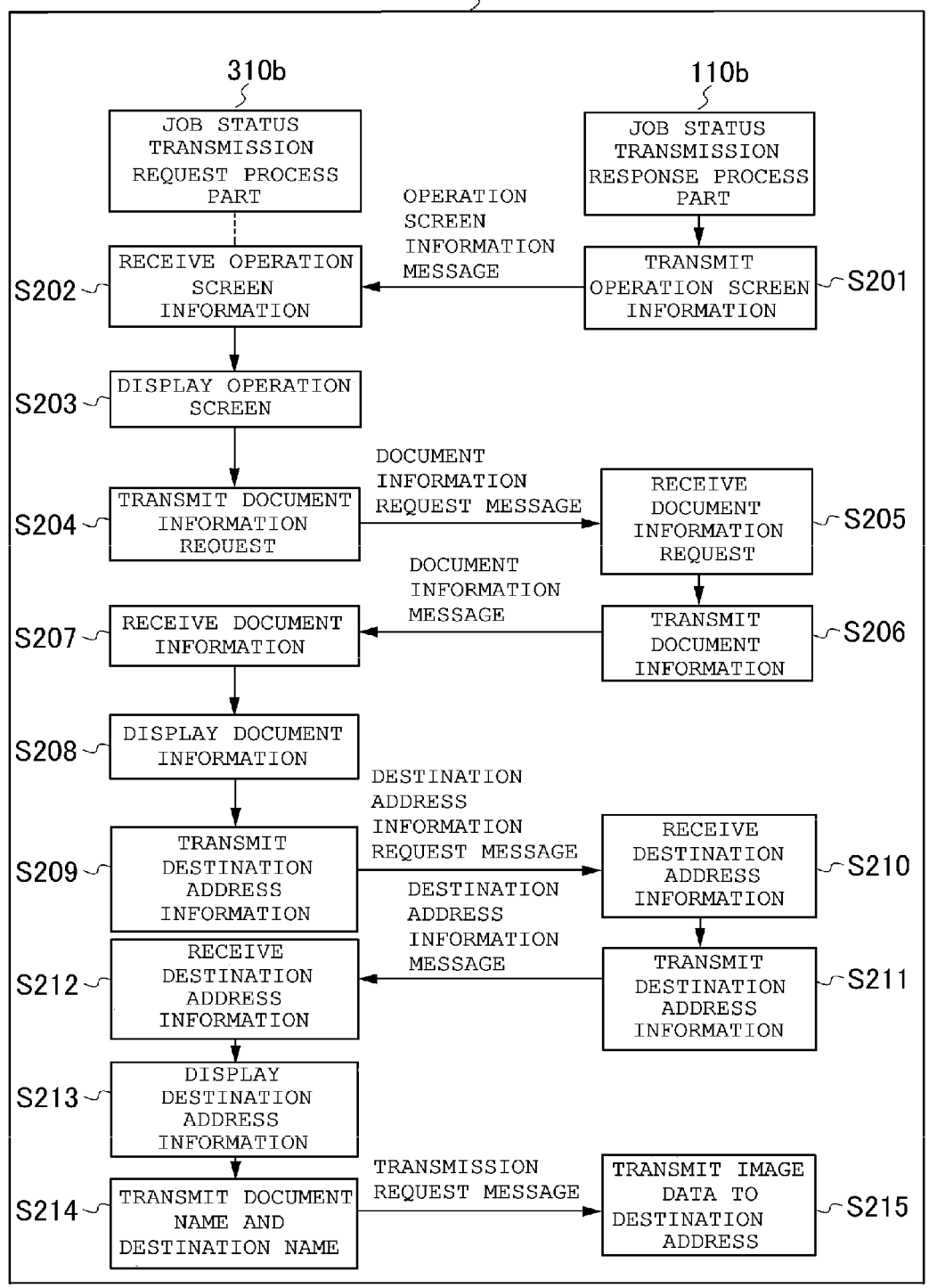

REMOTELY DISPLAYING AN OPERATION SCREEN OF AN IMAGE FORMING APPARATUS

BACKGROUND

The present disclosure relates to an image forming apparatus which an SIP (Session Initiation Protocol) is installed, in particular, the present disclosure relates to a remotely operated image forming apparatus, to an operation system for an image forming apparatus (hereinafter, referred to as "image-forming-apparatus remote system"), and to a remote operation-screen display method for an image forming apparatus for displaying an operation screen of the image forming apparatus on a remote operation terminal.

In recent years, an image forming apparatus that is MFP (Multifunction Peripheral) can be operated from a remote operation terminal. For example, when an image processing apparatus (image forming apparatus) disclosed in Patent Literature 1 transmits an operation screen generated using a Web browser to a client apparatus (remote control terminal), the client apparatus receives the operation screen, and displays the operation screen on a panel of the client apparatus. An operation by a user through the operation screen permits the client apparatus to remotely operate the image processing apparatus. Thus, the generation of the operation screen using the Web browser eliminates the need for installation of a dedicated program in to the client apparatus, so that the user can operate the image forming apparatus disposed at a position remote from the client apparatus located close to a user.

CITATION LIST

Patent Literature

Patent Literature 1: Japanese Patent Publication Laid-open No. 2012-90025

SUMMARY OF THE INVENTION

Problem to be Solved by the Invention

The image processing apparatus of Patent Literature 1 generates an operation screen using a Web browser transmittable over the Internet utilizing TCP/IP (Transmission Control Protocol/Internet Protocol) that is a communication protocol, and provides the client apparatus with the operation screen. On this account, it needs to connect the image processing device to the client apparatus over the Internet to transmit the operation screen of the image processing apparatus to the client apparatus. In some cases, however, the communication protocol used in limited areas, such as an office and a factory, may connect an image-forming-apparatus remote system to a remote operation terminal using the SIP widespread in IP phones, telephone conferencing systems and the like, instead of the Internet TCP/IP. There still remains a problem that the image forming apparatus cannot transmit the operation screen to the remote operation terminal even when the image forming apparatus connected by the SIP communication protocol generates an operation screen using a Web browser.

The present disclosure is made in view of such circumstances, and an object of the present disclosure is to provide an image forming apparatus, an image-forming-apparatus remote system, and an operation-screen remote display method for an image forming apparatus, which is able to solve the aforementioned problem.

Means for Solving the Problem

An image forming apparatus according to the present disclosure is connected to a remote operation terminal by SIP, and includes a remote-operation request message receiving part that receives a remote-operation request message from the remote control terminal; a remote-operation response message transmitting part that transmits a remote-operation response message in response to the remote-operation request message; and an operation-screen information transmitting part that transmits operation screen information of the image forming apparatus to the remote operation terminal in accordance with a communication condition of a communication session, when an SIP-based communication session is established between the remote operation terminal and the image forming apparatus.

A image-forming-apparatus remote system according to the present disclosure includes a remote operation terminal, an image forming apparatus, and an SIP server, the remote control terminal comprising a remote-operation request message transmitting part that transmits a remote-operation request message to the image forming apparatus; a remote-operation response message receiving part that receives a remote-operation response message from the image forming apparatus; an operation-screen information receiving part that receives operation screen information from the image forming apparatus; and an operation screen display part that displays an operation screen of the image forming apparatus based on the received operation screen information, the image forming apparatus comprising a remote-operation request message receiving part that receives the remote-operation request message from the remote control terminal; a remote-operation response message transmitting part that transmits a remote-operation response message to the remote operation terminal; and an operation-screen information transmitting part that transmits the operation screen information to the remote operation terminal, the SIP server including a communication session establishing part that establishes an SIP-based communication session between the remote operation terminal and the image forming apparatus by relaying the remote-operation request message and the remote-operation response message, when the SIP-based communication session is established between the remote operation terminal and the image forming apparatus, the operation-screen information transmitting part transmits the operation screen information to the remote operation terminal in accordance with a communication condition of the communication session.

An operation-screen remote display method for an image forming apparatus according to the present disclosure is for an image-forming-apparatus remote system connected to a remote operation terminal by SIP, the method including a remote-operation request message receiving step of receiving a remote-operation request message from the remote control terminal; a remote-operation response message transmitting step of transmitting a remote-operation response message in response to the remote-operation request message; and an operation-screen information transmitting step of transmitting operation screen information of the image forming apparatus to the remote operation terminal in accordance with a communication condition of the communication session when an SIP-based communication session is established between the remote operation terminal and the image forming apparatus.

BRIEF DESCRIPTION OF THE DRAWINGS

FIG. 5 is a drawing showing procedures for transmitting image data in an image forming apparatus and a remote control terminal according to a third embodiment of the present disclosure.

Figure 1:
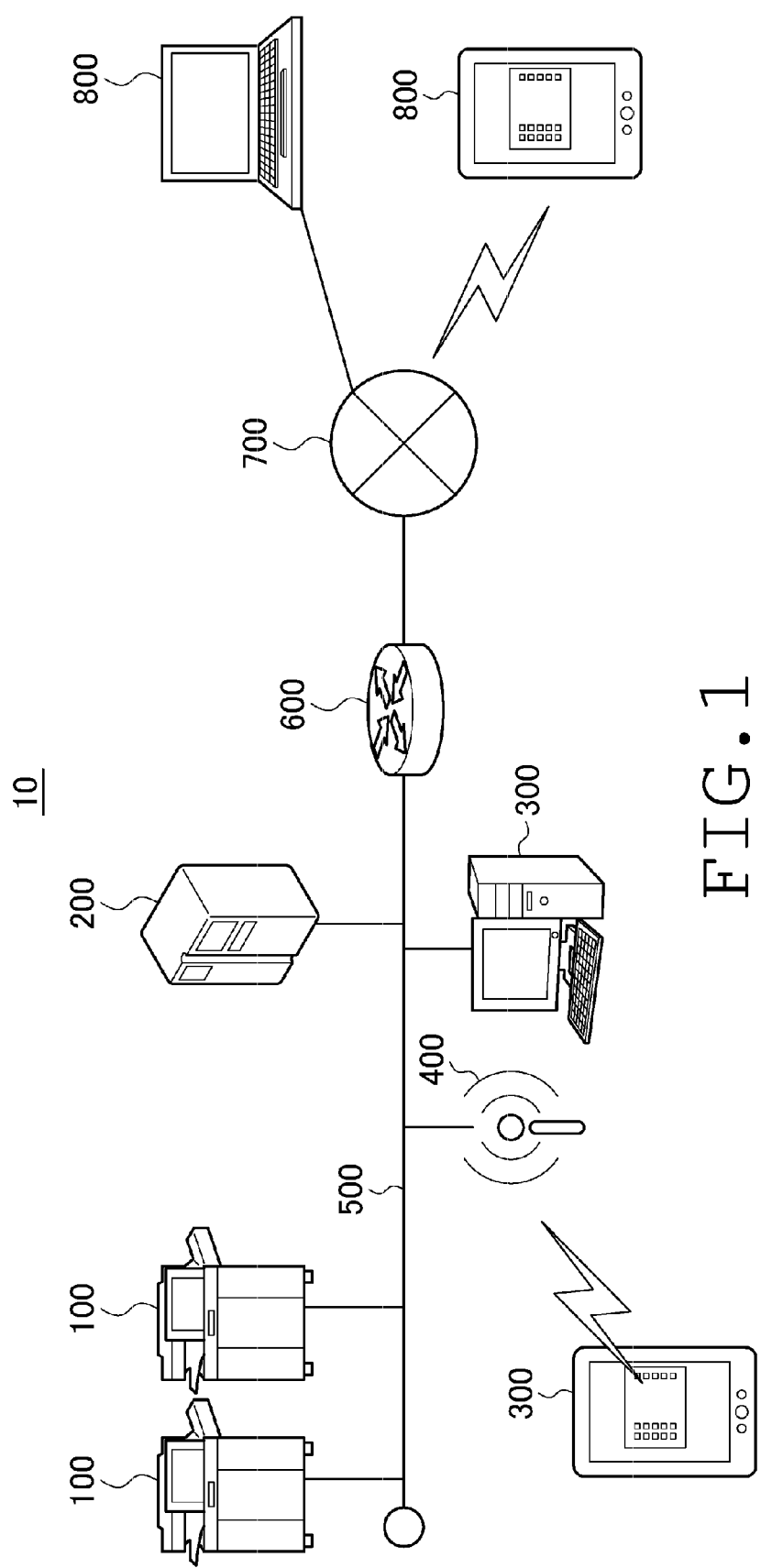
FIG. 1 is a drawing showing a system configuration of an image-forming-apparatus remote system according to a first embodiment of the present disclosure.

MODES FOR CARRYING OUT THE INVENTION (First Embodiment)

Hereinafter, a first embodiment for carrying out the present disclosure (hereinafter referred to as "Embodiment 1") will be described with reference to the accompanying drawings. An SIP is installed in an image forming apparatus and a remote operation terminal according to the embodiment. The embodiment allows such an image forming apparatus to be operated from the remote operation terminal.

First, a system configuration of an image-forming-apparatus remote system 10 according to the embodiment of the present disclosure will be described with reference to FIG. 1. The image-forming-apparatus remote system 10 shown in FIG. 1 includes image forming apparatuses 100, an SIP server 200, remote operation terminals 300, an access point 400, a network 500, a router 600, and an Internet 700. remote operation terminals 800 are connected with the Internet 700.

The image forming apparatus 100 is a printer, an MFP, a multifunction machine or the like. The SIP is installed in the image forming apparatus 100. The image forming apparatus 100 establishes connection with the remote operation terminal 300 through the SIP server 200. Then, the image forming apparatus 100 can transmit and receive data to and from the remote operation terminal 300.

The SIP server 200 performs call control to the image forming apparatus 100 in response to a request from the remote operation terminal 300. Thereby, the SIP server 200 establishes connection thereby.

The remote operation terminal 300 is a notebook PC, a smartphone or a tablet terminal or the like. The SIP is installed in the remote operation terminal 300. The remote operation terminal 300 establishes connection with the image forming apparatus 100 through the SIP server 200. Then, the remote operation terminal 300 can transmit and receive data to and from the image forming apparatus 100

The access point 400 is connected to the network 500. The access point 400 connects the remote operation terminal 300 sending a connection request by wireless communication to the network 500.

The network 500 is a LAN (Local Area Network) or the like. The network 500 is connected with a plurality of image forming apparatuses 100, the SIP server 200, a plurality of remote operation terminals 300, the access point 400, and the router 600.

The router 600 is connected to the network 500. The router 600 connects the Internet 700 and the network 500.

The Internet 700 is an IP network. The Internet 700 is connected with a plurality of remote operation terminals 800.

Next, functional configurations of the image forming apparatus 100 and the remote operation terminal 300 of the imaging system 10 will be described with reference to FIG. 2. The image forming apparatus 100 and the remote operation terminal 300 shown in FIG. 2 show the functional configurations of a single image forming apparatus 100 in the forming system 10 shown in FIG. 1 and a single remote operation terminal 300 connected to the access point 400. The other image forming apparatuses 100 and the other remote operation terminal 300 have similar functional configurations to those mentioned above.

First, a functional configuration of the image forming apparatus 100 will be described. The image forming apparatus 100 shown in FIG. 2 includes a control part 110, a memory part 120, a data storage part 130, an operation panel 140, an operation panel process part 150, a document reading part 160, an image process part 170, and a network communication part 180, each part of which are connected to one another by a bus or the like. The control part 110 is provided with a remote-operation response process part 110a, a job-status transmission response process part 110b, and a document transmission process part 110c. The memory part 120 is provided with a user information storage area 120a and an operation-screen information storage area 120b. The data storage part 130 is provided with an image data storage area 130a, a document box area 130b, and a destination-address information storage area 130c.

The job-status transmission response process part 110b is used in a second embodiment, and therefore the particulars thereof will reserve for the second embodiment. Further, the document transmission process part 110c is used in a third embodiment, and therefore the particulars thereof will reserve for the third embodiment. Moreover, the document box area 130b and destination-address information storage area 130c are used in the third embodiment, and therefore the particulars thereof will reserve for the third embodiment.

The control part 110 includes main storage means, such as a RAM and a ROM, and control means such as a CPU (Central Processing Unit). The control part 110 performs the overall control of the image forming apparatus 100, including various I/O parts, an interface such as a USB (Universal Serial Bus), and a bus controller or the like.

The remote-operation response process part 110a performs a remote-operations response process responding to a remote operation request from the remote operation terminal 300. The details of the remote-operation response process will follow later.

The memory part 120 is an auxiliary storage device configured of a flash memory or the like. The memory part 120 stores programs and data for the processes to be executed by the control part 110.

A user ID to identify a remote operation terminal 300 whose operation is to be permitted is stored in the user information storage area 120a for every remote operation terminal 300.

Information such as data for displaying an operation screen and data for operating the operation screen (hereinafter referred to as "operation screen information") is stored in the operation-screen information storage area 120*b*.

The data storage part 130 is a hard disk drive to store data and programs.

Image data read from the document reading part 160 and image data received from the remote operation terminal 300 via the network communication part 180 are stored in the image data storage area 130*a*.

The operation panel 140 is a liquid crystal panel which displays the operation screen and accepts an operation input by a user. The operation panel process part 150 performs a process for displaying on the operation panel 140 operation items corresponding to the functions the image forming apparatus 100 has a process for inputting a user's operation through the operation panel 140, and so forth.

When a user performs a reading operation from the operation panel 140, the document reading part 160 reads a document set on the document platen of the image forming apparatus 100, converts the document into an image, and outputs the image to the image process part 170. Upon reception of the image from the document reading part 160, the image process part 170 converts the image into image data of a printable graphic image, image data of an image transmittable by FAX or e-mail, or the like.

The network communication part 180 is provided with a removable LAN interface, and connected to the network 500.

Next, a functional configuration of the remote operation terminal 300 will be described. The remote operation terminal 300 shown in FIG. 2 includes a control part 310, a memory part 320, an operation panel 330, an operation panel process part 340, a network communication part 350, and a GPS process part 360, each of which is connected to one another by a bus or the like. The control part 310 is provided with a remote-operation request process part 310*a*, a job-status transmission request process part 310*b*, and a document transmission request process part 310*c*. The memory part 320 is provided with an operation-screen information storage area 320*a*, a document information storage area 320*b*, and a destination-address information storage area 320*c*.

The GPS process part 360 is used in the third embodiment, and therefore the particulars thereof will reserve for the third embodiment. Further, the job-status transmission request process part 310*b* is used in the second embodiment, and therefore the particulars thereof will reserve for the second embodiment. Furthermore, the document transmission request process part 310*c* is used in the third embodiment, and therefore the particulars thereof will reserve for the third embodiment. Moreover, the document information storage area 320*b* and destination-address information storage area 320*c* are used in the third embodiment, and therefore the particulars thereof will reserve for the third embodiment.

The control part 310 includes main storage means, such as a RAM and a ROM, and control means such as a CPU (Central Processing Unit). The control part 310 performs the overall control of the remote operation terminal 300, including various I/O parts, an interface such as a USB (Universal Serial Bus), and a bus controller or the like.

The remote-operation request process part 310*a* performs a remote-operations request process to send a remote operation request to the image forming apparatus 100. The details of the remote-operation request process will follow later.

The memory part 320 is an auxiliary storage device configured of a flash memory or the like, and stores programs and data for processes to be executed by the control part 310.

Operation screen information received from the image forming apparatus 100 is temporarily stored in the operation-screen information storage area 320*a*.

The operation panel 330 is a liquid crystal panel which displays operation items and accepts an operation input by a user. The operation panel process part 340 performs a process for displaying on the operation panel 330 operation items corresponding to the functions the remote operation terminal 300 has, a process for inputting a user's operation through the operation panel 330, a process for accepting an operation through the operation screen, and so forth.

The network communication part 350 is connected to the network 500 via the access point 400.

Figure 3:
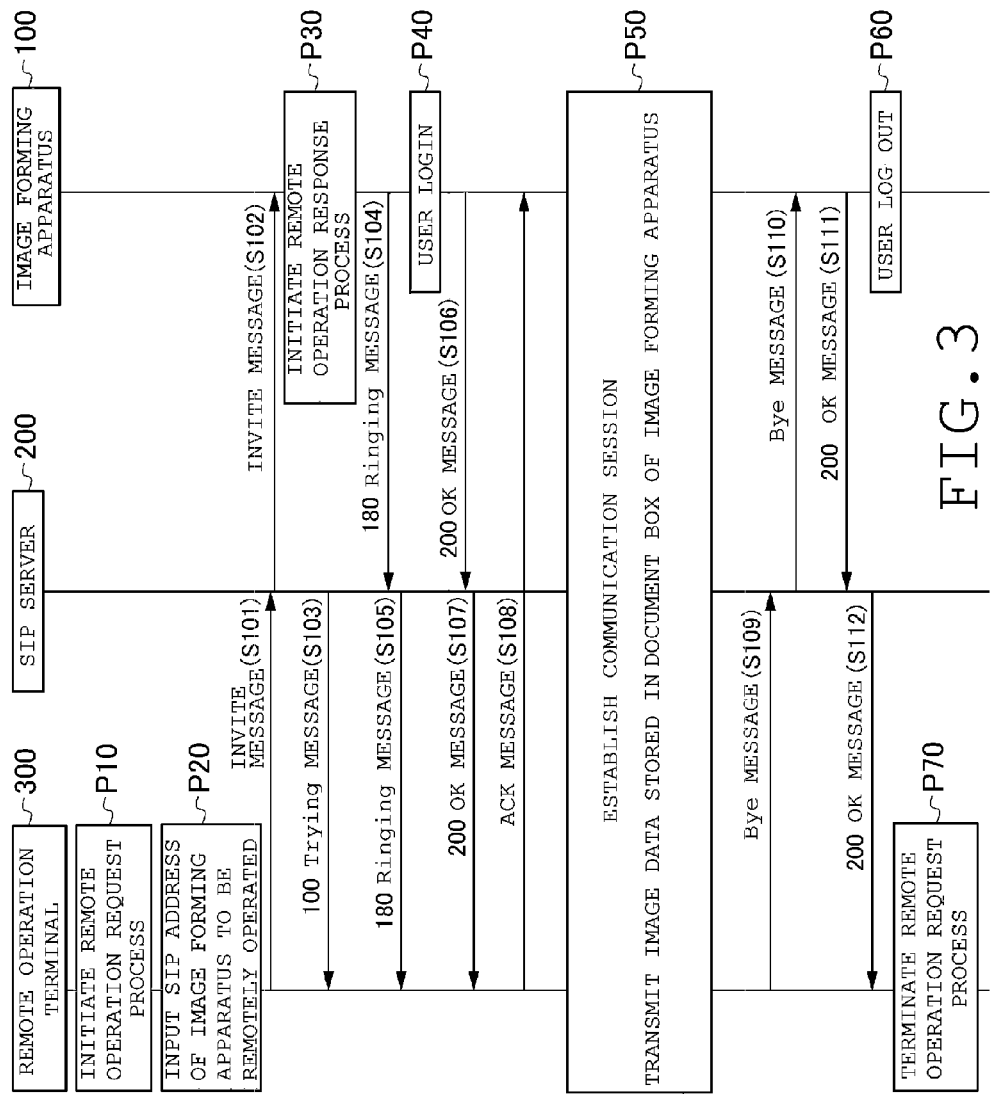
FIG. 3 is a drawing showing communication session establishing procedures in the image forming apparatus and the remote control terminal according to the first embodiment of the present disclosure.

Next, communication session establishing procedures in the image forming apparatus 100 and the remote operation terminal 300 will be described with reference to FIG. 3. The communication session establishing procedures of the image forming apparatus 100 and the remote operation terminal 300 shown in FIG. 3 are procedures for establishing a communication session between a single image forming apparatus 100 and a single remote operation terminal 300 in the image forming system 10 shown in FIG. 1. The same thing is true for the other image forming apparatuses 100 and the other remote operation terminals 300.

First, a user inputs a remote operation request to the image forming apparatus 100 through the operation panel 330 of the remote operation terminal 300. The operation panel process part 340 of the remote operation terminal 300 outputs the remote operation request to the control part 310. Upon reception of the remote operation request, the control part 310 activates the remote-operation request process part 310*a*. Then, the remote-operation request process part 310*a* of the control part 310 starts a remote-operation request process. (P10)

Next, the remote-operation request process part 310*a* of the remote operation terminal 300 displays on the operation panel 330 a guidance message for prompting a user to input a SIP address of the image forming apparatus 100 requested to be remotely operated. Then, the user inputs the SIP address of the image forming apparatus 100 to be remotely operated from the operation panel 330. (P20)

Then, the remote-operation request process part 310*a* of the remote operation terminal 300 transmits an INVITE message requesting a communication session start to the SIP server 200. Information on the communication session, such as the SIP address of the image forming apparatus 100 to be operated (hereinafter referred to as "communication session information") is embedded in an encrypted form into the INVITE message. In addition, information on the user, such as a user ID of the remote operation terminal 200 (hereinafter referred to as "user information") is also embedded in an encrypted form into the INVITE message. When the SIP address of the image forming apparatus 100 is "sips: hanako@abc.co.jp", for example, the SIP address is set in the communication session information. When the user ID is "mfp123", this user ID is set in the user information. The communication session information and the user information are embedded in an encrypted form into the INVITE message. (Step S101)

Next, upon reception of the INVITE message, the SIP server 200 extracts the communication session information from the INVITE message and decodes the information. Then, the SIP server 200 transmits the INVITE message to a SIP address of the image forming apparatus 100, which is set in the communication session information. (Step S102)

Next, when the network communication part 180 of the image forming apparatus 100 receives the INVITE message transmitted in step S102, the network communication part 180 notifies the control part 110 a remote operation response. Upon reception of the remote operation response, the control part 110 activates the remote-operation response process part 110*a*. Then, the remote-operation response process part 110*a* initiates a remote-operation response process. (P30)

Then, the SIP server 200 notifies the remote operation terminal 300 that the INVITE message is received. To this end, the SIP server 200 transmits a Trying message, which is a response message to the INVITE message, to the remote operation terminal 300. (Step S103)

Then, the remote-operation response process part 110*a* of the image forming apparatus 100 notifies the remote operation terminal 300 that the INVITE message is received. To this end, the remote-operation response process part 110*a* transmits a Ringing message, which is a response message to the INVITE message, to the SIP server 200. (Step S104)

Next, upon reception of the Ringing message, the SIP server 200 transmits the Ringing message to the remote operation terminal 300. (Step S105)

Then, the remote-operation response process part 110*a* of the image forming apparatus 100 extracts user information from the INVITE message and decodes the information to authenticate the user IDset in the user information. The authentication of the user ID is carried out by determining whether the user ID set in the user information is stored in the user information storage area 120*a*. When the authentication of the user ID ends in successfully, the remote-operation response process part 110*a* conducts an upper limit check of the number of login users in the image forming apparatus 100 to determine whether an operation request from the remote operation terminal 300 can be accepted. Otherwise, w hen the remote-operation response process part 110*a* determines that an operation from the remote operation terminal 300 is acceptable, the remote operation response processor 110*a* accepts a user's login. When the authentication of the user ID is ends in failure, or when the operation request from the remote operation terminal 300 is determined not to be acceptable, the remote operation response processor 110*a* transmits a predetermined error message to the SIP server 200 (not shown in FIG. 3). (P40)

Then, the remote-operation response process part 110*a* of the image forming apparatus 100 sets, in a 200 OK message, a condition requested by the image forming apparatus 100 during a communication session. Then, the remote-operation response process part 110*a* transmits the OK message to the SIP server. (Step S106)

Next, upon reception of the 200 OK message, the SIP server 200 transmits the 200 OK message to the remote operation terminal 300. (Step S107)

Next, upon reception of the 200 OK message, the remote-operation request process part 310*a* of the remote operation terminal 300 extracts the condition which is set in the 200 OK message 100 and requested by the image forming apparatus 100 during a communication session. The remote-operation request process part 310*a* determines a communication condition based on the conditions during the communication session presented by the image forming apparatus 100. The remote-operation request process part 310*a* transmits an ACK message, in which the communication condition is set, to the image forming apparatus 100. (Step S108)

Next, reception of the ACK message from the remote operation terminal 300 by the remote-operation response process part 110*a* of the image forming apparatus 100 establishes a communication session between the remote operation terminal 300 and the image forming apparatus 100. Then, operation screen information stored in the operation-screen information storage area 120*b* of the image forming apparatus 100 is transmitted to the remote operation terminal 300 depending on the communication condition determined in step S108.

The operation screen information transmitted from the image forming apparatus 100 is temporarily stored in the operation-screen information storage area 320*a*. An operation screen is displayed on the operation panel 330 of the remote operation terminal 300 based on the operation screen information. When the operation screen is displayed on the operation panel 330, a user inputs operation data through the operation screen. The operation data is transmitted to the image forming apparatus 100 depending on the communication condition determined in step S108. (P50)

Next, when a user inputs termination of the operation of the image forming apparatus 100 from the remote operation terminal 300, the remote-operation request process part 310*a* transmits a BYE message to the SIP server 200. (S109)

Next, upon reception of the BYE message, the SIP server 200 transmits the BYE message to the SIP address of the image forming apparatus 100 set during the communication session information in step S102. (Step S110)

Then, the remote-operation response process part 110*a* of the image forming apparatus 100 notifies the remote operation terminal 300 that the BYE message is received. To this end, the remote-operation response process part 110*a* transmits a 200 OK message, which is a response message to the BYE message, to the SIP server 200. (Step S111)

Then, when the remote-operation response process part 110*a* of the image forming apparatus 100 transmits the BYE message to the SIP server 200, the image forming apparatus 100 accepts a user log-out from the remote operation terminal 300. When remote-operation response process part 110*a* terminates the remote control response process, the communication session is released. (P60)

Then, when the SIP server 200 receives the 200 OK message, the SIP server 200 transmits the 200 OK message to the remote operation terminal 300. (Step S112)

Next, the remote operation terminal 300 receives the 200 OK message. Thereby, the remote-operation response process part 110*a* of the remote operation terminal 300 terminates the remote-operation response process. (P70)

As described above, the image-forming-apparatus remote system 10 of the Embodiment 1 exchanges a message shown in FIG. 3 between the remote operation terminal 300 and the image forming apparatus 100 via the SIP server 200. Thereby, an operation screen of the image forming apparatus 100 is displayed on the operation panel 330 of the remote operation terminal 300. Further, a user can operate the image processing apparatus 100 through the operation screen displayed on the operation panel 330 of the remote operation terminal 300. As apparent from the above, even when the image forming apparatus 100 and the remote operation terminal 300 are connected to each other by the SIP, it is possible to display the operation screen of the image forming apparatus 100 on the operation panel 330 of the remote operation terminal 300 to operate the image forming apparatus 100 through the operation screen.

(Second Embodiment)

Hereinafter, a second embodiment for carrying out the present disclosure (hereinafter referred to as "Embodiment 2") will be described with reference to the accompanying drawings. The Embodiment 2 is intended for allowing a user to cause the image forming apparatus 100 to execute a job according to the Embodiment 1 from the remote operation terminal 300 and to further check a job status.

Figure 2:
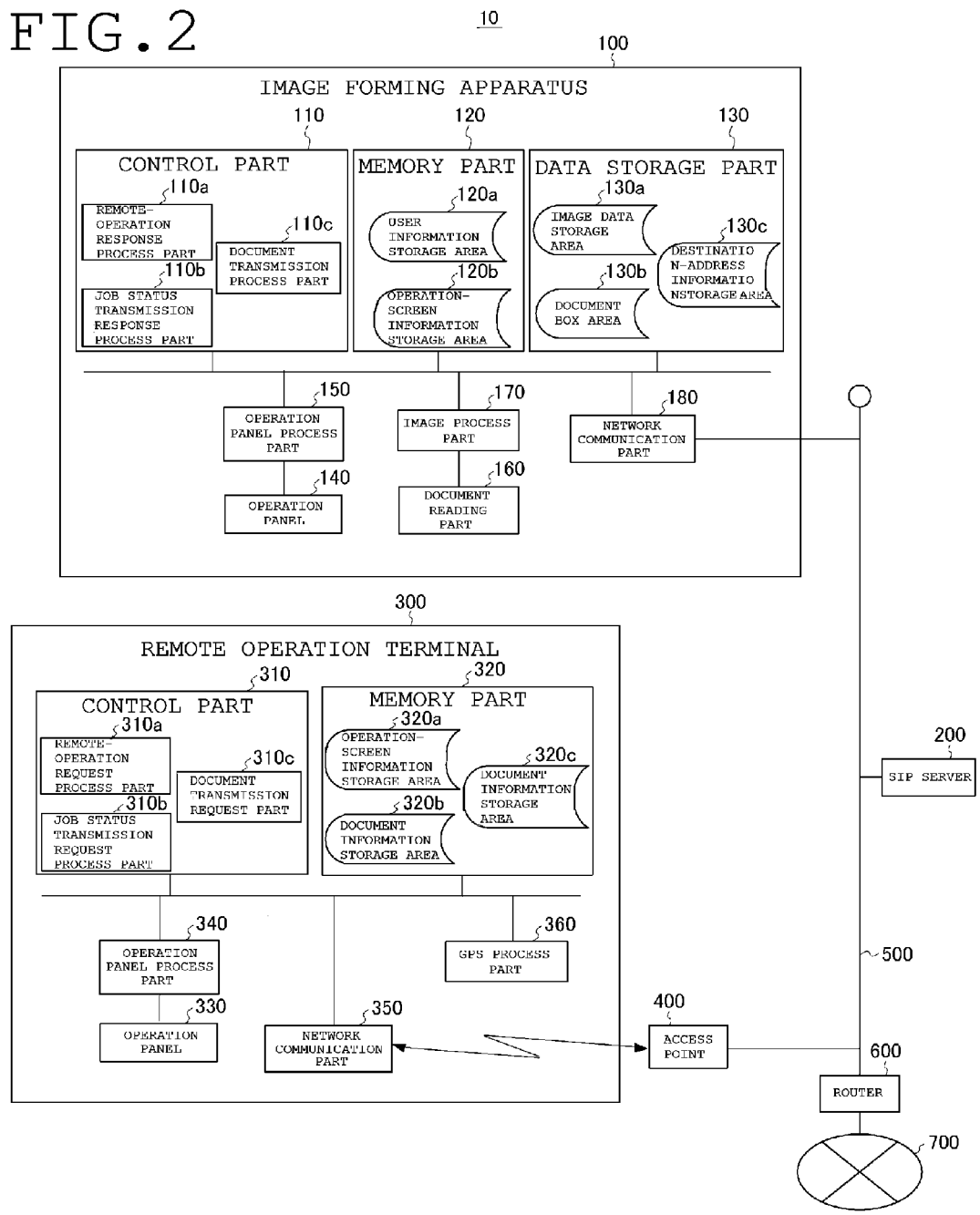
FIG. 2 is a drawing showing functional configurations of an image forming apparatus and a remote operation terminal in the image-forming-apparatus remote system shown in FIG. 1.

The image-forming-apparatus remote system 10 according to the Embodiment 2 has the same system configuration as that of the image-forming-apparatus remote system 10 according to the Embodiment 1 shown in FIG. 1.

Further, the image forming apparatus 100 and the remote operation terminal 300 of the image-forming-apparatus remote system 10 according to the Embodiment 2 have the same functional configurations as those of the image forming apparatus 100 and the remote operation terminal 300 of the image-forming-apparatus remote system 10 according to the Embodiment 1 shown in FIG. 2. In addition, the embodiment 2 uses the transmission job status response process part 110b and the job-status transmission request process part 310b. The communication session establishing procedures in the forming apparatus 100 and the remote operation terminal 300 according to the Embodiment 2 are identical to those in the image forming apparatus 100 and the remote operation terminal 300 according to the Embodiment 1 shown in FIG. 3 except for the procedure of (P50). Thus, only the differences from the Embodiment 1 will be described.

The job-status transmission response process part 110b executes a job status transmission response process for responding to a job status transmission request from the remote operation terminal 300. The details of the job status transmission response process will follow later.

The job-status transmission request process part 310b executes a job status transmission request process for sending a job status transmission request to the image forming apparatus 100. The details of the job status transmission request process will follow later.

The communication session establishing procedures (P50) in the image forming apparatus and the remote operation terminal shown in FIG. 3 are as follows.

When the remote-operation response process part 110a of the image forming apparatus 100 receives an ACK message from the remote operation terminal 300, a communication session is established between the remote operation terminal 300 and the image forming apparatus 100. Then, the operation screen information stored in the operation-screen information storage area 120b of the image forming apparatus 100 is transmitted to the remote operation terminal 300 depending on the communication condition determined in step S108. The operation screen information transmitted from the image forming apparatus 100 is temporarily stored in the operation-screen information storage area 320a. Based on the operation screen information, an operation screen is displayed on the operation panel 330 of the remote operation terminal 300 When a user performs an operation to execute a job in the image forming apparatus 100 through the operation screen, operation data for the operation to execute the job is transmitted to the image forming apparatus 100 depending on the communication condition determined in step S108. At this time, information, which is added to each job to identify the executed job (hereinafter referred to as "job ID"), is displayed on the operation panel 330 (P50).

Figure 4:
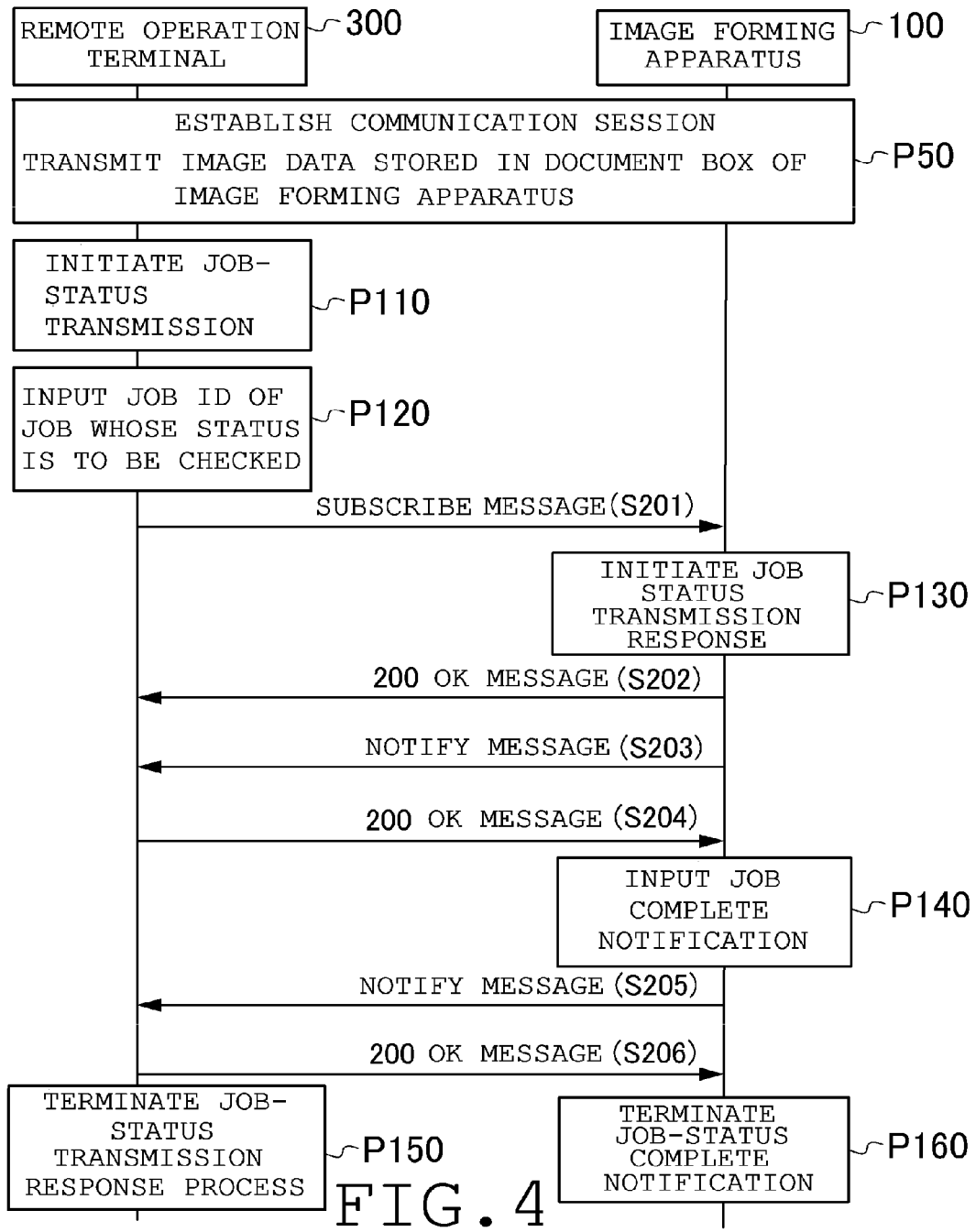
FIG. 4 is a drawing showing procedures for checking a job status executed by an image forming apparatus according to a second embodiment of the present disclosure from a remote operation terminal.

Next, procedures for checking a job status being executed, as a separate event, by the image forming apparatus 100 through the operation screen of the remote operation terminal 300, in the communication session establishing procedures indicated by P50 in the Embodiment 2 shown in FIG. 3 will be described with reference to FIG. 4. It is to be noted that a user has already executed the job in the image forming apparatus 100 through the operation screen of the remote operation terminal 300 before check of a job status. the procedures for checking the job status shown in FIG. 4 are described by omitting the process of the SIP server 200 for brevity's sake.

First, when a user inputs a job status transmission request to the image forming apparatus 100 through the operation screen of the remote operation terminal 300 in a state where the communication session is established (P50), the operation panel process part 340 of the remote operation terminal 300 outputs the request to the control part 310. Upon reception of the job status transmission request, the control part 310 activates a job status transmission request processing part 310b. Then, the job-status transmission request process part 310b starts a job status transmission request process. (P110)

Then, the job-status transmission request process part 310b of the remote operation terminal 300 displays on the operation panel 330 a guidance message for prompting a user to input a job ID of the job to check the job status. The user inputs the job ID displayed on the operation panel 330 of the remote operation terminal 300 through the operation panel 330. (P120)

Then, the job-status transmission request process part 310b of the remote operation terminal 300 transmits to the image forming apparatus 100 a SUBSCRIBE message requesting a status notification of the job being executed by the image forming apparatus 100. event information (hereinafter referred to as "presence information"), and user information of the remote operation terminal 300 are embedded in an encrypted form into an event header of the SUBSCRIBE message. For example, to check the job status of a job which is being executed by the image forming apparatus 100 and has a job ID of "12345", "Event: presence; id=12345" is set in the presence information of the SUBSCRIBE message. When a user ID is "mfp123", this user ID is set in the user information and is embedded into the SUBSCRIBE message. (Step S201)

Next, upon reception of the SUBSCRIBE message sent in step S201, the network communication part 180 of the image forming apparatus 100 notifies the control part 110 of a job status transmission response. When the job status transmission response is received, the control part 110 activates the job status transmission response processing part 110b. Then, the job status transmission response processing part 110b initiates a job status transmission response process. (P130)

Then, the job-status transmission response process part 110b of the image forming apparatus 100 extracts the user information from the SUBSCRIBE message, and decodes the user information to authenticate the user ID set in the user information. The authentication of the user ID is carried out by determining whether the user ID set in the user information is stored in the user information storage area 120a. When the authentication of the user ID ends in is successfully, the job-status transmission response process part 110b notifies the remote operation terminal 300 that a request for SUBSCRIBE message is accepted. To this end, the job-status transmission response process part 110b transmits a 200 OK message, which is a response message to a SUBSCRIBE message, to the remote operation terminal 300. (Step S202)

Then, when the job-status transmission response process part 110*b* of the image forming apparatus 100 extracts the job status of the job corresponding to the job ID, the job-status transmission response process part 110*b* transmits a NOTIFY message into which the job status is embedded to the remote operation terminal 300. When "Event: presence; id=12345" is set in the presence information in the SUBSCRIBE message of step S201, and the job status of the job with the job ID of "12345" is "active (executing)", for example, "Event: presence; id=12345" and "Subscription-State: active" are set in the presence information in the event header of the NOTIFY message, and are embedded into the NOTIFY message. (Step S203)

Then, the job-status transmission request process part 310*b* of the remote operation terminal 300 transmits a 200 OK message, which is a response message to the NOTIFY message, to the image forming apparatus 100 to notify the image forming apparatus 100 that the NOTIFY message is received. (Step S204)

Next, upon reception of the 200 OK message transmitted in step S204, the job-status transmission response process part 110*b* of the image forming apparatus 100 outputs the job ID and waiting for job completion to the control part 110. When the control part 110 receives the job ID and the waiting for job completion, and detects the job completion corresponding to the job ID, the control part 110 outputs a job completion notification to the job status transmission response process part 110*b*. The job-status transmission response process part 110*b* receives the job completion notification. (P140)

Then, the job-status transmission response process part 110*b* of the image forming apparatus 100 transmits a NOTIFY message into which the job completion notification is embedded to the remote operation terminal 300 to notify the remote operation terminal 300 that the job is completed. When "Event: presence; id=12345" is set in the presence information of the SUBSCRIBE message in step S201, and the job with a job ID of "12345" is "noresource (there is no monitoring resource)", for example, "Event: presence; id=12345" and "Subscription-State: noresource" are set in the presence information in the event header of the NOTIFY message, and are embedded into the NOTIFY message. (Step S205)

Then, the job-status transmission request process part 310*b* of the remote operation terminal 300 transmits a 200 OK message, which is a response message to the NOTIFY message, to the image forming apparatus 100 to notify the image forming apparatus 100 that the NOTIFY message is received. (Step S206)

Next, the job-status transmission request process part 310*b* of the remote operation terminal 300 transmits the 200 OK message. Then, the job-status transmission request process part 310*b* of the remote operation terminal 300 displays a job status of a job corresponding to the job ID on the operation panel, and terminates the job status transmission request process. (P150)

Next, the job-status transmission response process part 110*b* of the image forming apparatus 100 receives the 200 OK message. Then, the job status transmission response processing part 110*b* terminates the job status transmission response process. (P160)

As stated above, the image-forming-apparatus remote system 10 according to the Embodiment 2 enables a user to cause a job to execute on the image forming apparatus 100 through the operation screen displayed on the operation panel 330 of the remote operation terminal 300, and check a job status. When the execution of a job is completed, a job completion notification can be notified to the remote operation terminal 300. As apparent from the above, when the user causes the image forming apparatus 100 to execute a job from the remote operation terminal 300, and, an application sent a job execution request is terminated without waiting for the job completion, or when an error is occurred during execution of a job, the user can check a job status. Therefore, even when a user is at a position remote from the image forming apparatus 100, the user can check a status of the image forming apparatus 100 when no response is received even by sending a remote operation request from the remote operation terminal 300 to the image forming apparatus 100.

(Third Embodiment)

Hereinafter, a third embodiment for carrying out the present disclosure (hereinafter referred to as "Embodiment 3") will be described with reference to the accompanying drawings. The Embodiment 3 is intended for allowing a user to cause the image forming apparatus 100 according to the Embodiment 1 to transmit image data stored in a document box of the image forming apparatus 100 from the remote operation terminal 300 to a destination address.

The image-forming-apparatus remote system 10 according to the Embodiment 3 has the same configuration as that of the image-forming-apparatus remote system 10 according to the Embodiment 1 shown in FIG. 1

Also, the image forming apparatus 100 and the remote operation terminal 300 of the image-forming-apparatus remote system 10 according to the Embodiment 3 have the same functional configurations as those of the image forming apparatus 100 and the remote operation terminal of the image-forming-apparatus remote system 10 according to the Embodiment 1 shown in FIG. 2. In addition, the embodiment 3 uses a document transmission process part 110*c*, a document box area 130*b*, a destination-address information storage area 130*c*, a document transmission request process part 310*c*, a document information storage area 320*b*, a destination-address information storage area 320*c*, and a GPS process part 360.

Further, the image forming apparatus 100 and the remote operation terminal 300 according to the Embodiment 3 have the same communication session establishing procedures as those of the image forming apparatus 100 and the remote operation terminal 300 according to the Embodiment 1 shown in FIG. 3. Thus, only the portions different from the Embodiment 1 will be described.

The document transmission process part 110*c* transmits information (hereinafter referred to as "operation screen information") such as data for displaying an operation screen and data for operating the operation screen to the remote operation terminal 300. Further, the document transmission process part 110*c* performs a document transmission process. In the document transmission process, document information and destination address information are transmitted in response to a document transmission request from the remote operation terminal 300. The details of the document transmission process will follow later.

The document box area 130*b* is provided with a plurality of document boxes for every user. Image data read from the document reading part 160, and image data received from the remote operation terminal 300 via the network communication part 180 are stored in each document box. Further, document information, such as a name of the stored image data (hereinafter referred to as "document name"), the size and a creation date, is stored in each document box.

Destination address information, such as destination addresses registered by a user in an address book in advance, a destination name given to the destination addresses, and a registration date of the destination addresses, is stored in the destination-address information storage area 130c.

The document transmission request process part 310c executes a document transmission request process. In the document transmission request process, a document transmission request is sent to the image forming apparatus 100. The details of the document transmission request process will follow later.

The document information is temporarily stored in the document information storage area 320b to display the document information received from the image forming apparatus 100, The address information is temporarily stored in the destination-address information storage area 320c to display the destination address information received from the image forming apparatus 100.

The GPS process part 360 acquires a current position of the remote operation terminal 300 using the GPS (Global Positioning System).

Next, a transmission procedure of the image data stored in the document box area 130b of the image forming apparatus 100 during the communication session establishing procedures indicated by P50 shown in FIG. 3 will be described with reference to FIG. 5.

First, the document transmission process part 110c of the image forming apparatus 100 retrieves the operation screen information stored in the operation-screen information storage area 120b. Then, the document transmission process part 110c transmits an operation screen information message in which the operation screen information is set to the remote operation terminal 300. (Step S201)

Next, upon reception of the operation screen information message, the network communication part 350 of a remote operation terminal 300 notifies the control part 310 of the document transmission request. Upon reception of the document transmission request, the control part 110 activates the document transmission request processing part 310c. The document transmission request process part 310c initiates a document transmission request process. The document transmission request process part 310c extracts the operation screen information set in the received operation screen information message, and then temporarily stores the information in the operation-screen information storage area 320a. (Step S202)

Then, the document transmission request process part 310c of the remote operation terminal 300 displays an operation screen on the operation panel 330 based on the operation screen information retrieved from the operation-screen information storage area 320a. (Step S203)

Then, a user performs an operation so as to display a list of documents in the document box through the operation screen displayed on the operation panel 330 of the remote operation terminal 300 to. Then, the document transmission request process part 310c transmits a document information request message in which the document information request is set to the image forming apparatus 100. (Step S204)

Then, the document transmission process part 110c of the image forming apparatus 100 receives the document information request message. (Step S205)

Next, the document transmission process part 110c of the image forming apparatus 100 retrieves a document box corresponding to the user ID of the remote operation terminal 300 from the document box area 130a. Further, the document transmission process part 110c retrieves the document information stored in the document box. The document transmission process part 110c transmits a document information message in which the document information is set to the remote operation terminal 300. (Step S206)

Subsequently, the document transmission request process part 310c of the remote operation terminal 300 receives the document information message. (Step S207)

Then, the document transmission request process part 310c of the remote operation terminal 300 extracts the document information from the document information message, and stores the information in the document information storage area 320b. The document transmission request process part 310c displays the document information on the operation screen of the operation panel 330. (Step S208)

Then, a user performs an operation to display the destination address information of the image forming apparatus 100 through the operation screen displayed on the operation panel 330 of the remote operation terminal 300. The document transmission request process part 310c transmits a destination address information request message to the image forming apparatus 100. (Step S209)

Then, the document transmission process part 110c of the image forming apparatus 100 receives the destination address information request demessage. (Step S210)

Then, the document transmission process part 110c of the image forming apparatus 100 retrieves the destination address information from the destination-address information storage area 130c. The document transmission process part 110c transmits a destination address information message in which the destination address information is set to the remote operation terminal 300. (Step S211)

Subsequently, the document transmission request process part 310c of the remote operation terminal 300 receives the destination address information message. (Step S212)

Then, the document transmission request process part 310c of the remote operation terminal 300 extracts the destination address information from the destination address information message, and stores the information in the destination-address information storage area 320c. The document transmission request process part 310c displays the destination address information on an operation screen of the operation panel 330. (Step S213)

Next, a user selects a document name from the document box information displayed on the operation panel 330 of the remote operation terminal 300, and selects a destination name from the destination address information. Subsequently, the document transmission request process part 310c transmits a transmission request message in which the document name and destination name are set to the image forming apparatus 100. When the document transmission request process part 310c completes the transmission of the transmission request message, the document transmission request process part 310c terminates the document transmission request process. Upon detection of the termination of the document transmission request process, the control part 310 resumes an operation of the remote-operation request process part 310a. (Step S214)

Next, upon reception of the transmission request message, the document transmission process part 110c of the image forming apparatus 100 extracts the document name and destination name set in the transmission request message. The document transmission process part 110c retrieves image data corresponding to the document name from the document box corresponding to the user ID of the document box area 130a. Further, the document transmission process part 110c retrieves the destination address corresponding to the destination name from the destination-address information storage area 130c. The document transmission process part 110c transmits the image data to the destination address, and then terminates the document transmission process. When the control part 110 detects that the document transmission process by the document transmission process part 110c is completed, the control part 110 resumes an operation of the remote-operation response process part 110a. (Step S215)

As stated above, the image-forming-apparatus remote system 10 according to the Embodiment 3 is requested by a user to provide the document information and destination address information from the operation screen displayed on the operation panel 330 of the remote operation terminal 300. Subsequently, the remote operation terminal 300 transmits the document name selected from the document information and the destination name selected from the destination address information to the image forming apparatus. This allows the image data corresponding to the document name of the document box to be transmitted from the image forming apparatus 100 to the destination address corresponding to the destination name. In this manner, even when the image forming apparatus 100 and the remote operation terminal 300 are connected to each other by the SIP, a user can transmit image data stored in the document box of the image forming apparatus 100 through the operation screen displayed on the operation panel 330 of the remote operation terminal 300 using the destination address registered in the address book of the image forming apparatus 100.

It is to be noted that while in the image forming systems 10 according to the Embodiment 1, Embodiment 2 and Embodiment 3, the descriptions are made by giving an example where the image forming apparatus 100 connected to the network 500, and the remote operation terminal 300 radio communicating with the access point 400 connected to the network 500, or the remote operation terminal 300 directly connected to the network 500 are connected using the SIP, not necessarily limited thereto, similar processes may be performed by installing the SIP even for a remote operation terminal 800 connected to the Internet. In other words, the remote operation terminal 800 maybe connected to the network 500 via the Internet 700 and the router 600 to establish an SIP-based communication session with the image forming apparatus 100. This permits an operation screen of the image forming apparatus 100 to be displayed, and an operation to be input from the operation screen.

While the Embodiment 2 is described in connection with the procedures for checking a job status on the image forming apparatus 100, the Embodiment 2 is not necessarily limited thereto. For example, alternatively, it is feasible to check all sorts of statuses detectable by the image forming apparatus 100, such as a failure status indicating whether a failure is occurred in the image forming apparatus 100, a power-supply status of a main power supply or a sub power supply of the image forming apparatus 100, or a load status of a CPU of the image forming apparatus 100

While the Embodiment 3 is described by giving an example where the destination address information stored in the image forming apparatus 100 is displayed on the operation panel 330 of the remote operation terminal 300, and a user selects a destination name from the destination address information, the Embodiment 3 is not necessarily limited thereto. For example, alternatively, a user may input the destination address from the operation screen. In this case, it is preferable to provide a preventing function against an erroneous input and an unauthorized input.

It is likely that when a user inputs a destination address, image data stored in the image forming apparatus 100 is transmitted to a wrong destination address. Besides, if once an input of a destination address is prohibited, a user is unable to transmit image data to any destination address not registered in the address book of the image forming apparatus 100 until the destination address is registered in the address book. In such a case, the image forming apparatus 100 has only to determine a current location of the remote operation terminal 300, and permit transmission to the destination address when the remote operation terminal 300 is located within a predetermined range (within an office or factory premises). In this connection, the current position of the remote operation terminal 300 can be acquired by the GPS process part 330. And/or, a wrong transmission preventing function of the image forming apparatus 100 should be automatically enabled when the destination address is input. Under this condition, the wrong transmission preventing function has only to permit transmission to the input destination address when the input destination address is determined to be appropriate.

Furthermore, it is also possible, in the Embodiment 3, to display on the operation screen the destination address information in the address book provided in the remote operation terminal 300 other than a case where a user directly inputs a destination address from the operation screen. Alternatively, it is still possible to display on the operation screen the destination address information in the directory database by accessing the directory database in which the destination address information is stored through the LDAP (Lightweight Directory Access Protocol). Selecting a destination name by a user from the destination address information displayed on the operation screen allows the destination address to be determined. Even in the destination name thus determined as above, when the remote operation terminal 300 is located within a predetermined range, or (and) when the destination address is determined to be appropriate by the wrong transmission preventing function, transmission to the can be permitted.

The image forming apparatus, the image-forming-apparatus remote system, and the operation-screen remote display method for an image forming apparatus according to the present disclosure enable a user to operate the image forming apparatus connected by the SIP from the remote operation terminal. In addition, a user allows the image forming apparatus to cause a job to be executed from the operation screen, and check a job status being executed on the image forming apparatus. Furthermore, a user can transmit image data stored in the image forming apparatus to a destination address registered in the address book of the image forming apparatus through the operation screen.

While the present disclosure is described in connection with specific embodiments, it goes without saying that the embodiments are mere one illustrative example of the present disclosure, and are not necessarily limited to the above-mentioned embodiments.

INDUSTRIAL APPLICABILITY

The present disclosure is suitable for an image forming apparatus, an image forming system, and an operation-screen remote display method for an image forming apparatus, but is not necessarily limited to such an image forming apparatus, an image forming system, and operation-screen remote display method for the image forming apparatus. Rather, the present disclosure may be applied to an apparatus in which the SIP is installed, a system equipped with such an apparatus, and a method using such an apparatus.

REFERENCE SIGNS LIST 10 image-forming-apparatus remote system
100 image forming apparatus 110 control part
110a remote-operation response process part
110b job status transmission response process part
110c document transmission process part
120 memory part
120a user information storage area
120b operation-screen information storage area
130 data storage part
130a image data storage area
130b document box area
130c destination-address information storage area
140 operation panel
150 operation panel process part
160 document reading part
170 image process part
180 network communication part
200 SIP server
300 remote operation terminal
310 control part
310a remote-operation request process part
310b job status transmission request process part
310c document transmission request process part
320 memory part
320a operation-screen information storage area
320b document information storage area
320c destination-address information storage area
330 operation panel
340 operation panel process part
350 network communication part
360 GPS process part
400 access point
500 network
600 router
700 Internet
800 remote operation terminal

What is claimed is:

1. An image-forming-apparatus remote system comprising:
a remote operation terminal connectable with an image forming apparatus using a Session Initiation Protocol (SIP);
the image forming apparatus connectable with the remote operation terminal using the SIP; and
an SIP server connected to the remote operation terminal and the image forming apparatus via a network,
wherein the remote operation terminal:
transmits a remote-operation request message including i) an SIP address of the image forming apparatus requested to be remotely operated and ii) user information of the remote operation terminal, to the image forming apparatus;
receives a remote-operation response message from the image forming apparatus;
receives operation screen information from the image forming apparatus; and
displays an operation screen for operating the image forming apparatus based on the received operation screen information,
wherein the image forming apparatus:
includes a hard disk drive for storing image data read from a document reading part and image data received from the remote operation terminal via the network;
receives the remote-operation request message from the remote operation terminal;
transmits the remote-operation response message to the remote operation terminal, when the image forming apparatus i) stores user information that is the same as the user information in the remote-operation request message, and ii) determines an operation request from the remote operation terminal can be accepted by an upper limit check of the number of login users in the image forming apparatus; and
transmits the operation screen information to the remote operation terminal in accordance with a communication condition determined by the remote operation terminal among communication conditions presented by the image forming apparatus, when an SIP-based communication session is established between the remote operation terminal and the image forming apparatus,
wherein the SIP server:
establishes the SIP-based communication session between the remote operation terminal and the image forming apparatus by relaying the remote-operation request message and the remote-operation response message,
wherein the remote operation terminal further:
transmits a document information request message to the image forming apparatus in response to a user performing an operation using the operation screen;
receives a document information message corresponding to the document information request message from the image forming apparatus;
displays document information extracted from the document information message; and
transmits a transmission request message including a document name selected from the document information to the image forming apparatus and a destination address, and
wherein the image forming apparatus further:
determines a current location of the remote operation terminal; and
transmits the image data in the hard disk drive corresponding to the document name to the destination address, when the remote operation terminal is located within a predetermined range.

2. The image-forming-apparatus remote system according to claim 1, wherein
the remote operation terminal:
transmits a status-transmission request message to the image forming apparatus; and
receives a status-transmission response message from the image forming apparatus, and
the image forming apparatus:
receives the status-transmission request message from the remote operation terminal; and
transmits the status-transmission response message to the remote operation terminal.

3. The image-forming-apparatus remote system according to claim 2, wherein
the status-transmission response message includes a job status of the image forming apparatus.

4. The image-forming-apparatus remote system according to claim 2, wherein
the status-transmission response message includes a job completion notification of the image forming apparatus.

5. The image-forming-apparatus remote system according to claim 1, wherein
the image data is included in a document box in the hard disk drive.

6. The image-forming-apparatus remote system according to claim 1, wherein the remote operation terminal further:
transmits a destination address information request message to the image forming apparatus in response to a user performing an operation using the operation screen;
receives a destination address information message corresponding to the destination address information request message from the image forming apparatus; and
displays destination address information extracted from the destination address information message;
the destination address included in the transmission request message is selected from the destination address information; and
the destination address is included in an address book in the hard disk drive.

7. The image-forming-apparatus remote system according to claim 1, wherein
the destination address is input via the operation screen in the remote operation terminal.

8. The image-forming-apparatus remote system according to claim 1 wherein
the destination address is included in an address book in the remote operation terminal.

9. The image-forming-apparatus remote system according to claim 1, wherein
the destination address is included in a Lightweight Directory Access Protocol (LDAP).

10. The image-forming-apparatus remote system according to claim 1, wherein
the current location of the remote operation terminal is determined by using a Global Positioning System (GPS).

11. The image-forming-apparatus remote system according to claim 1, wherein
the predetermined range includes one of an office premise and a factory premise.

* * * * *